(12) United States Patent
Eidson

(10) Patent No.: US 7,602,873 B2
(45) Date of Patent: Oct. 13, 2009

(54) CORRECTING TIME SYNCHRONIZATION INACCURACY CAUSED BY ASYMMETRIC DELAY ON A COMMUNICATION LINK

(75) Inventor: John C. Eidson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 666 days.

(21) Appl. No.: 11/317,294

(22) Filed: Dec. 23, 2005

(65) Prior Publication Data

US 2007/0147562 A1 Jun. 28, 2007

(51) Int. Cl.
H04L 7/00 (2006.01)
(52) U.S. Cl. .................................. 375/371; 375/358
(58) Field of Classification Search ............. 375/354, 375/355, 358, 371
See application file for complete search history.

(56) References Cited

U.S. PATENT DOCUMENTS

| 6,609,077 B1 * | 8/2003 | Brown et al. ............... 702/117 |
| 7,126,800 B2 * | 10/2006 | Premerlani et al. ............ 361/68 |
| 2006/0251084 A1 * | 11/2006 | Elliot ........................ 370/398 |

FOREIGN PATENT DOCUMENTS

| DE | 19917354 | 10/2000 |
| EP | 1659718 | 5/2006 |

OTHER PUBLICATIONS

European Search Report dated Mar. 6, 2007—3 Pages.
T. Gotoh, K. Imamura and A. Kaneko—"Improvement Of NTP Time Offset Under The Asymmetric Network With Double Packets Method"; 2002 Conference on Precision Electromagnetic Measurements; Conference Digest. CPEM 2002, Ottawa, Canada, Jun. 16-21, 2002; Conference on Precision Elecromagnetic Measurements, New York, NY: IEEE, US, Jun. 16, 2002; pp. 448-449, XP010604064.

Kenneth W. Monington and Judah Levine—"Time Synchronization Using The Internet"; Frequency Control Symposium, 1997, Proceedings Of The 1997 IEEE International, Orlando, FL, USA, May 28-30, 1997, New York, NY, IEEE, USA, May 28, 1997, pp. 395-403, XP010257463.

Andreas Fasbender and Ingo Rulands—"On Assessing Undirectional Latencies In Packet-Switched Networks"; Communications, 1997. ICC '97 Montreal, Towards the Knowledge Millennium. 1997 IEEE International Conference On Montreal, QUE, Canada, Jun. 8-12, 1997, New York, NY, USA, IEEE, US, vol. 1, Jun. 8, 1997, pp. 490-494, XP010227065.

Holmeide O et al—"Time Synchronization In Switched Ethernet Is Not Easy. Latency Depends On Load And Architecture. However, This Problem Can Be Solved If Time Servers Are Integrated In The Ethernet Switch And Ethernet Enabled Node"; Internet Citation, (Online); Sep. 2001, XP002909937; Retrieved From The Internet: URL: HTTP://Ethernet.Industrial-Networking-Com/Articles/I07Switched.ASP>; (Retrieved on Mar. 22, 2002).

D. Couvet, G. Florin and S. Natkin—"A Statistical Clock Synchronization Algorithm For Anisotropic Networks"; Proceedings Of The Symposium on Reliable Distributed Systems. Pisa, Sep. 30-Oct. 2, 1991, Los Alamitos, IEEE Comp. Soc. Press, US, vol. Symp. 10, Sep. 30, 1991, pp. 42-51, XP010025113.

* cited by examiner

Primary Examiner—David B Lugo

(57) ABSTRACT

Techniques for correcting time synchronization inaccuracy caused by asymmetric delays on a communication link. Time synchronization according to the present techniques includes determining an asymmetry in a propagation delay on a communication link used by a first device and a second device to exchange timing information and incorporating the asymmetry into a determination of a clock offset between the first and second devices.

26 Claims, 7 Drawing Sheets ers 30 and 32 and exchange time stamp measurements with one another using packets carried on the communication link 110. The timestamp measurements enable a determination of a clock offset between the time held in the local clock 10 and the time held in the local clock 12. The processor 224 uses the clock offset to perform time adjustments to the local clock 12 which is a slave clock in this example.

CORRECTING TIME SYNCHRONIZATION INACCURACY CAUSED BY ASYMMETRIC DELAY ON A COMMUNICATION LINK

BACKGROUND

A wide variety of devices may include a local clock that maintains a time-of-day. Examples of devices that may have a local time-of-day clock include computer systems, test instruments, industrial control devices, environmental control devices, and home appliances.

A time synchronization protocol may be used to synchronize a local clock in a device. A time synchronization protocol may be one in which a device exchanges timing information with a reference time source via a communication link. The exchanged timing information may be used to determine a clock offset that indicates a relative time difference between a local clock and a reference time source. For example, the IEEE 1588 time synchronization protocol includes the exchange of timing packets via a communication link.

Asymmetric delays on a communication link may reduce the accuracy of time synchronization. In IEEE 1588 time synchronization, for example, a propagation delay experienced by a timing packet in one direction over an Ethernet cable may differ from a propagation delay experienced by a timing packet in the opposite direction over the Ethernet cable. Similar asymmetric delays may occur on fiber optic cables and wireless communication links. Unfortunately, a time synchronization protocol may base its clock offset calculations on an assumption that the delays on a communication link are symmetric and any asymmetry in the delays may reduce the accuracy of time synchronization.

SUMMARY OF THE INVENTION

Techniques are disclosed for correcting time synchronization inaccuracy caused by asymmetric delays on a communication link. Time synchronization according to the present techniques includes determining an asymmetry in a propagation delay on a communication link used by a first device and a second device to exchange timing information and incorporating the asymmetry into a determination of a clock offset between the first and second devices.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
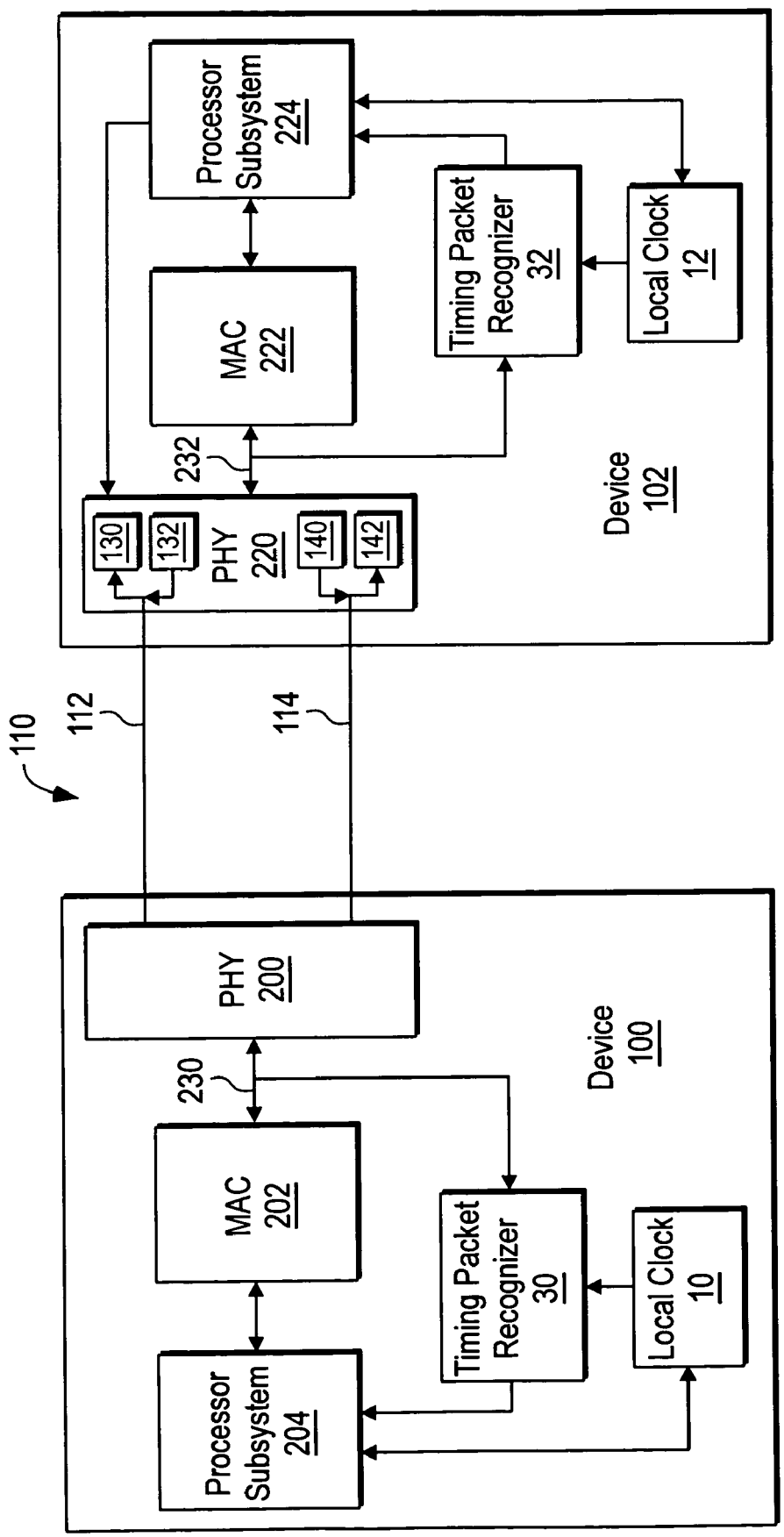
FIG. 1 shows a pair of devices and that implement the present techniques.

FIG. 1 shows a pair of devices 100 and 102 that incorporate the present techniques. The device 100 includes a local clock 10 and the device 102 includes a local clock 12. The devices 100 and 102 maintain time synchronization in the local clocks 10 and 12 by exchanging timing information via a communication link 110. The devices 100 and 102 determine an asymmetry between a propagation delay on a first portion 112 of the communication link 110 and a propagation delay on a second portion 114 of the communication link 110 and incorporate the asymmetry into a determination of a clock offset between the local clocks 10 and 12. In one embodiment, the devices 100 and 102 determine a clock offset by exchanging timing packets and measuring the transmit and receive times of the timing packets according to the IEEE 1588 time synchronization protocol.

Example embodiments of the devices 100 and 102 include computer systems, test instruments, industrial control devices, environmental control devices, home appliances, etc.

The devices 100 includes a processor subsystem 204 and the device 102 includes a processor subsystem 224. The processor subsystems 204 and 224 generate timing packets and exchange the timing packets via the communication link 110. In the example shown, the local clock 10 is a master clock and the local clock 12 is a slave clock according to the IEEE 1588 time synchronization protocol.

The device 100 includes a physical interface circuit (PHY) 200 and a media access circuit (MAC) 202 that enable the transmission and reception of timing packets via the communication link 110. The processor subsystem 204 in the device 100 includes code that provides a network protocol stack for communication via the communication link 110. Similarly, the device 102 includes a PHY 220 and a MAC 222 that enable the transmission and reception of timing packets and the processor subsystem 224 includes code that provides a network protocol stack for communication via the communication link 110.

The device 100 includes a timing packet recognizer 30 that snoops a data path 230 between the MAC 202 and the PHY 200. The timing packet recognizer 30 generates timestamps in response to timing packets on the data path 230. The device 102 includes a timing packet recognizer 32 that snoops a data path 232 between the MAC 222 and the PHY 220 and that generates timestamps in response to timing packets on the data path 232.

The processor subsystems 204 and 224 obtain timestamp measurements from their respective timing packet recognizers 30 and 32 and exchange time stamp measurements with one another using packets carried on the communication link 110. The timestamp measurements enable a determination of a clock offset between the time held in the local clock 10 and the time held in the local clock 12. The processor 224 uses the clock offset to perform time adjustments to the local clock 12 which is a slave clock in this example.

Figure 2A:
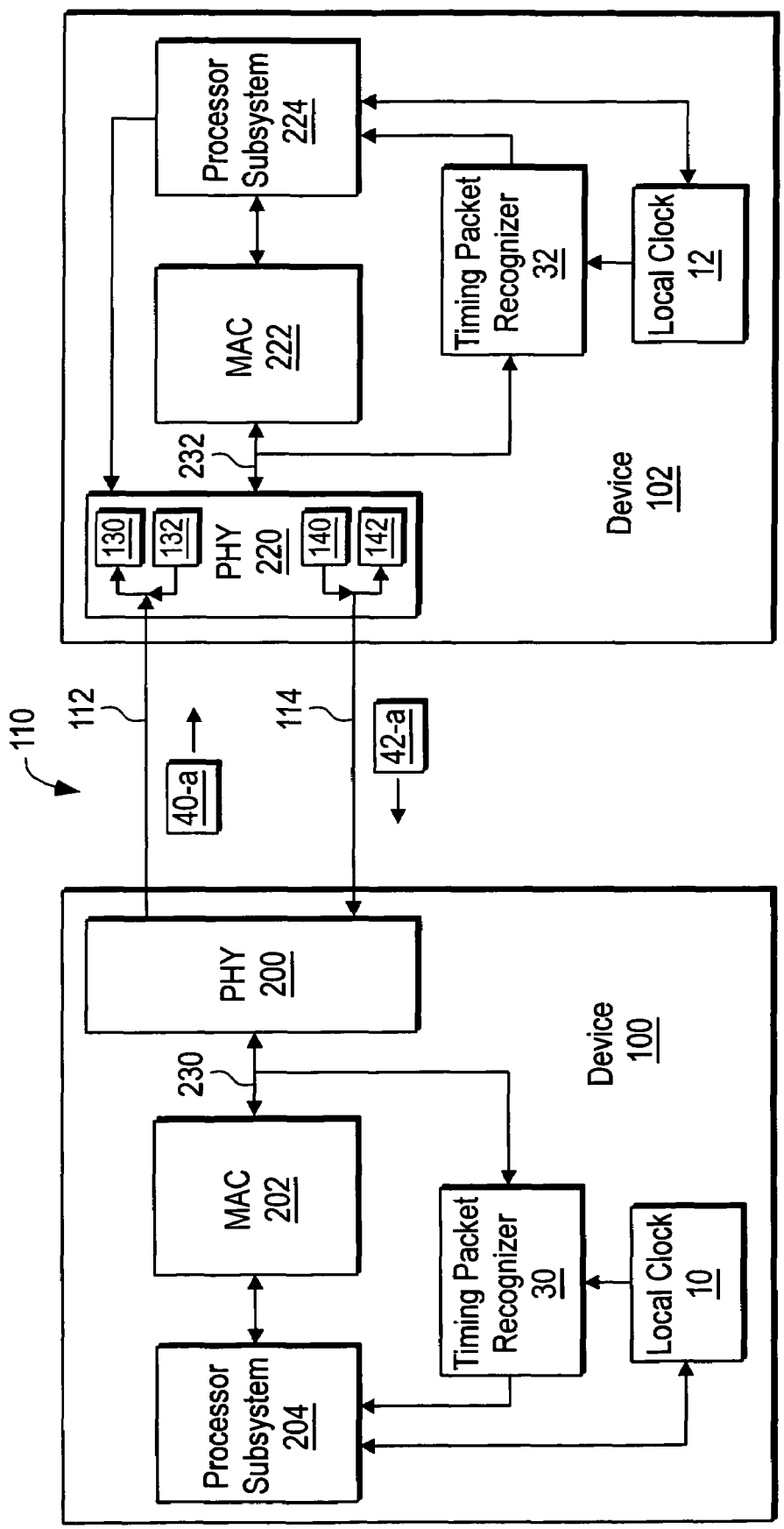
FIGS. 2a-2b illustrate a technique for measuring an asymmetry of a communication link.
Figure 2B:
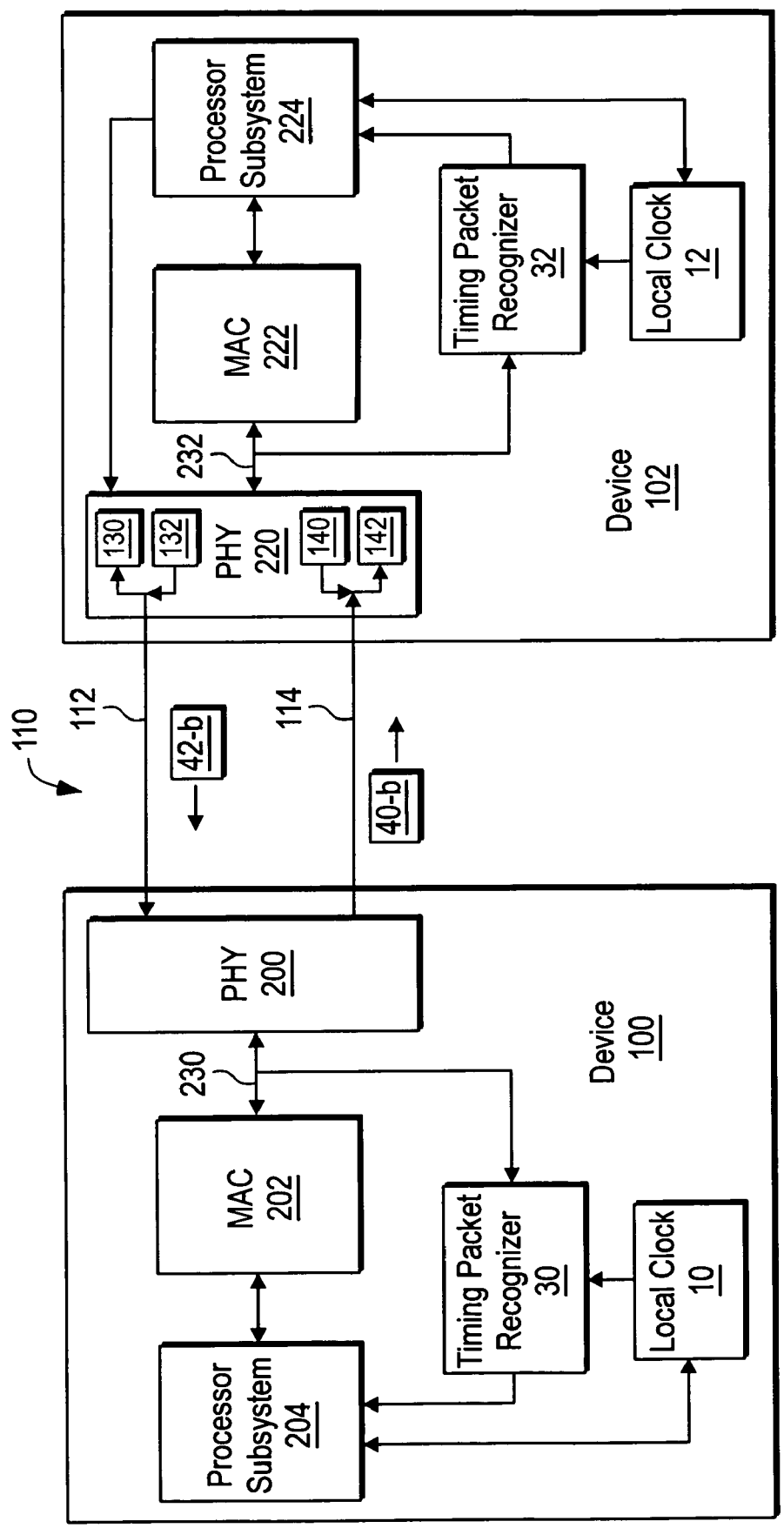

FIGS. 2a-2b illustrate a technique for measuring an asymmetry of the communication link 110 by running a time synchronization experiment (experiment A) to determine a first clock offset for the local clocks 10 and 12 and then reconfiguring the directions of transmission on the first and second portions 112 and 114 and running another time synchronization experiment (experiment B) to determine a second clock offset for the local clocks 10 and 12. The asymmetry is derived from the first and second clock offsets. The measurement and computation of clock offsets using two different configurations of the communication link 110 enables the common and differential mode propagation times on the communication link 110 to be determined. The differential contribution is then used to correct the normal operation and eliminate the clock offset error that would otherwise occur.

In the experiment A (FIG. 2a), the processor subsystem 204 generates a timing packet 40-a and transfers the timing packet 40-a to the device 102 via the first portion 112 using the MAC 202 and the PHY 200. The timing packet recognizer 30 generates a timestamp T1-a in response to the timing packet 40-a on the data path 230. The processor subsystem 224 receives the timing packet 40-a using the PHY 220 and the MAC 222. The timing packet recognizer 32 generates a timestamp T2-a in response to the timing packet 40-a on the data path 232.

Thereafter, the processor subsystem 224 generates a timing packet 42-a and transfers it to the device 100 via the second portion 114 using the MAC 222 and the PHY 220. The timing packet recognizer 32 generates a timestamp T3-a in response to the timing packet 42-a on the data path 232. The processor subsystem 204 receives the timing packet 42-a using the PHY 200 and the MAC 202 and the timing packet recognizer 30 generates a timestamp T4-a in response to the timing packet 42-a on the data path 230.

The timestamps T1-a through T4-a yielded by the experiment A enable a determination of a first clock offset (OFFSET-a) between the local clocks 10 and 12 for a configuration of the communication link 110 in which the first portion 112 carries information from the device 100 to the device 102 and the second portion 114 carries information from the device 102 to the device 100. The communication link 110 is then reconfigured for the experiment B so that the second portion 114 carries information from the device 100 to the device 102 and the first portion 112 carries information from the device 102 to the device 100.

In the experiment B (FIG. 2b), the processor subsystem 204 generates a timing packet 40-b and transfers the timing packet 40-b to the device 102 via the second portion 114 using the MAC 202 and the PHY 200. The timing packet recognizer 30 generates a timestamp T1-b in response to the timing packet 40-b on the data path 230. The processor subsystem 224 receives the timing packet 40-b using the PHY 220 and the MAC 222 and the timing packet recognizer 32 generates a timestamp T2-b in response to the timing packet 40-b on the data path 232. The processor subsystem 224 generates a timing packet 42-b and transfers it to the device 100 via the first portion 112 using the MAC 222 and the PHY 220. The timing packet recognizer 32 generates a timestamp T3-b in response to the timing packet 42-b on the data path 232. The processor subsystem 204 receives the timing packet 42-b using the PHY 202 and the MAC 200 and the timing packet recognizer 30 generates a timestamp T4-b in response to the timing packet 42-b on the data path 230.

The timestamps T1-b through T4-b enable a determination of a second clock offset (OFFSET-b) between the local clocks 10 and 12 for a configuration of the communication link 110 in which the second portion 114 carries information from the device 100 to the device 102 and the first portion 112 carries information from the device 102 to the device 100. An asymmetry between the first and second portions 112 and 114 of the communication link 110 may then be derived from the OFFSET-a and OFFSET-b.

In one embodiment, the PHY 220 in the device 102 includes a receiver 130 and a transmitter 132 for the first portion 112 and a transmitter 140 and a receiver 142 for the second portion 114. In this embodiment, the processor subsystem 224 places the communication link 110 into the configuration for the experiment A by sending a signal to the PHY 220 that causes the PHY 220 to enable the receiver 130 and the transmitter 140 and disable the transmitter 132 and the receiver 142. The processor subsystem 224 places the communication link 110 into the configuration for the experiment B by sending a signal to the PHY 220 that causes the PHY 220 to disable the receiver 130 and the transmitter 140 and enable the transmitter 132 and the receiver 142. In another embodiment, the PHY 220 includes one receiver and one transmitter and a switching circuit that connects the transmitter to the first portion 112 and the receiver to the second portion 114, or visa versa, under command of the processor subsystem 224.

The PHY 200 includes circuitry for sensing which of the first and second portions 112 and 114 is the transmit line and which is the receive line to the device 100. The capability of sensing transmit and receive lines may be implemented in the device 100 in accordance with Ethernet standards. For example, Ethernet includes the auto-MDIX protocol for sensing transmit and receive lines and for and switching the transmit and receive lines to the PHY 200. The PHY 200 may sense any traffic, special auto-MDIX signals, etc.

In another example, if the PHY 200 senses the timing packet 42-a from the device 102 on the second portion 114, it indicates that the second portion 114 is the receive line to the device 100. If the PHY 200 senses the timing packet 42-b from the device 102 on the first portion 112, it indicates that the first portion 112 is the receive line to the device 100. The capability of sensing transmit and receive lines may be implemented in the device 100 in accordance with Ethernet standards.

In other embodiments, predetermined signaling on the communication link 110 is used to switch transmit and receive lines for the explicit purpose of measuring asymmetry. The device 102 may send a command to the device 100 to cause it to reverse the transmit and receive lines at the device 100 to correspond to an analogous reversal at the device 102. For example, the processor subsystem 224 may send a command packet to the processor subsystem 204 that causes the processor subsystem 204 to reverse the transmit and receive lines of the PHY 200 using, for example, a switching circuit, relay, etc. in the device 100, while the processor subsystem 224 reverses the transmit and receive lines of the PHY 220.

Figure 3:
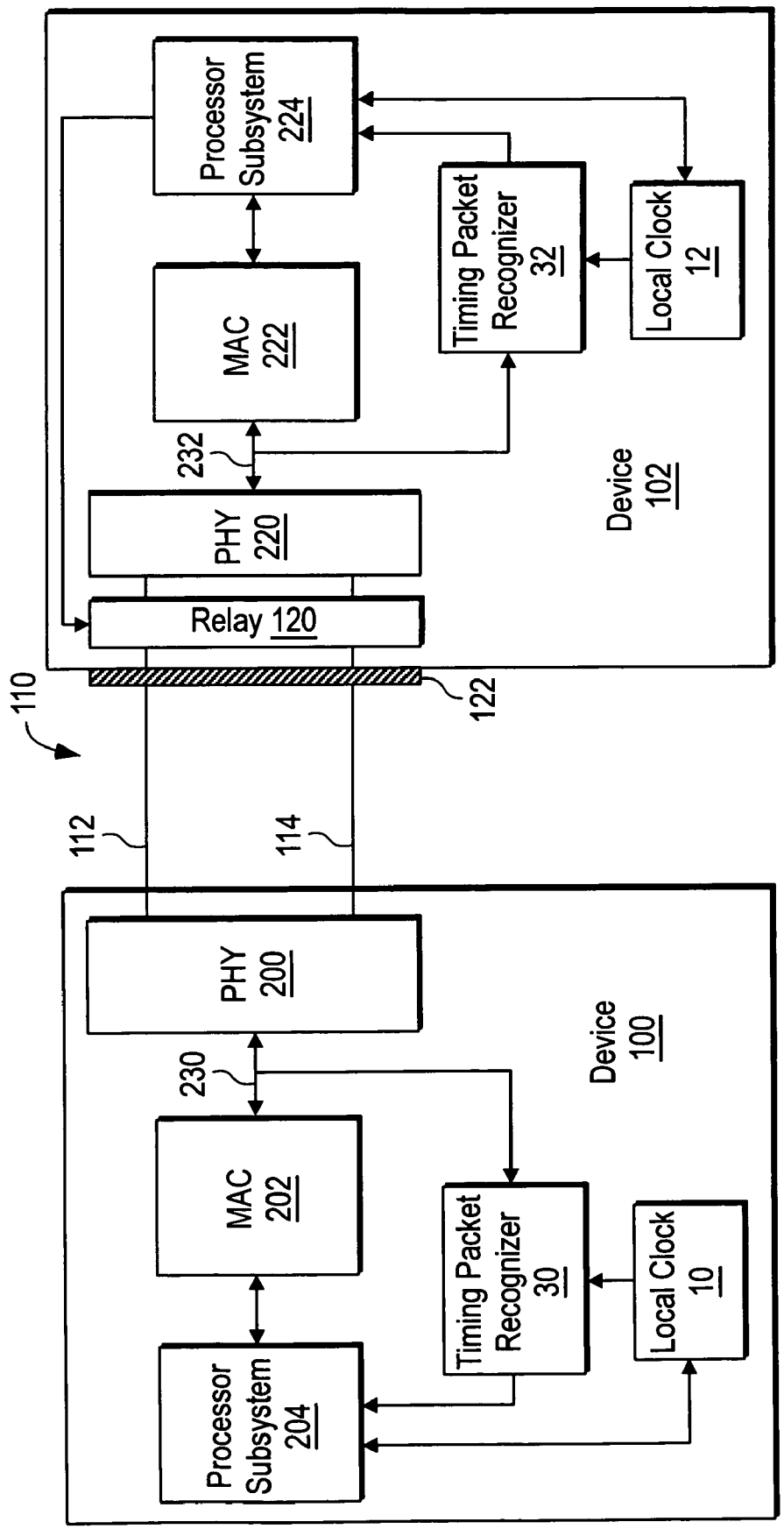
FIG. 3 shows a relay for reversing the transmit and receive lines of a communication link.

FIG. 3 shows a relay 120 placed between the PHY 220 and a connector 122 that couples the device 102 to the communication link 110. The relay 120 is controlled by a signal from the processor subsystem 224. The processor subsystem 224 controls which of the first and second portions 112 and 114 is the transmit line and which is the receive line to the device 102 by controlling the settings of the relay 120.

Figure 4A:
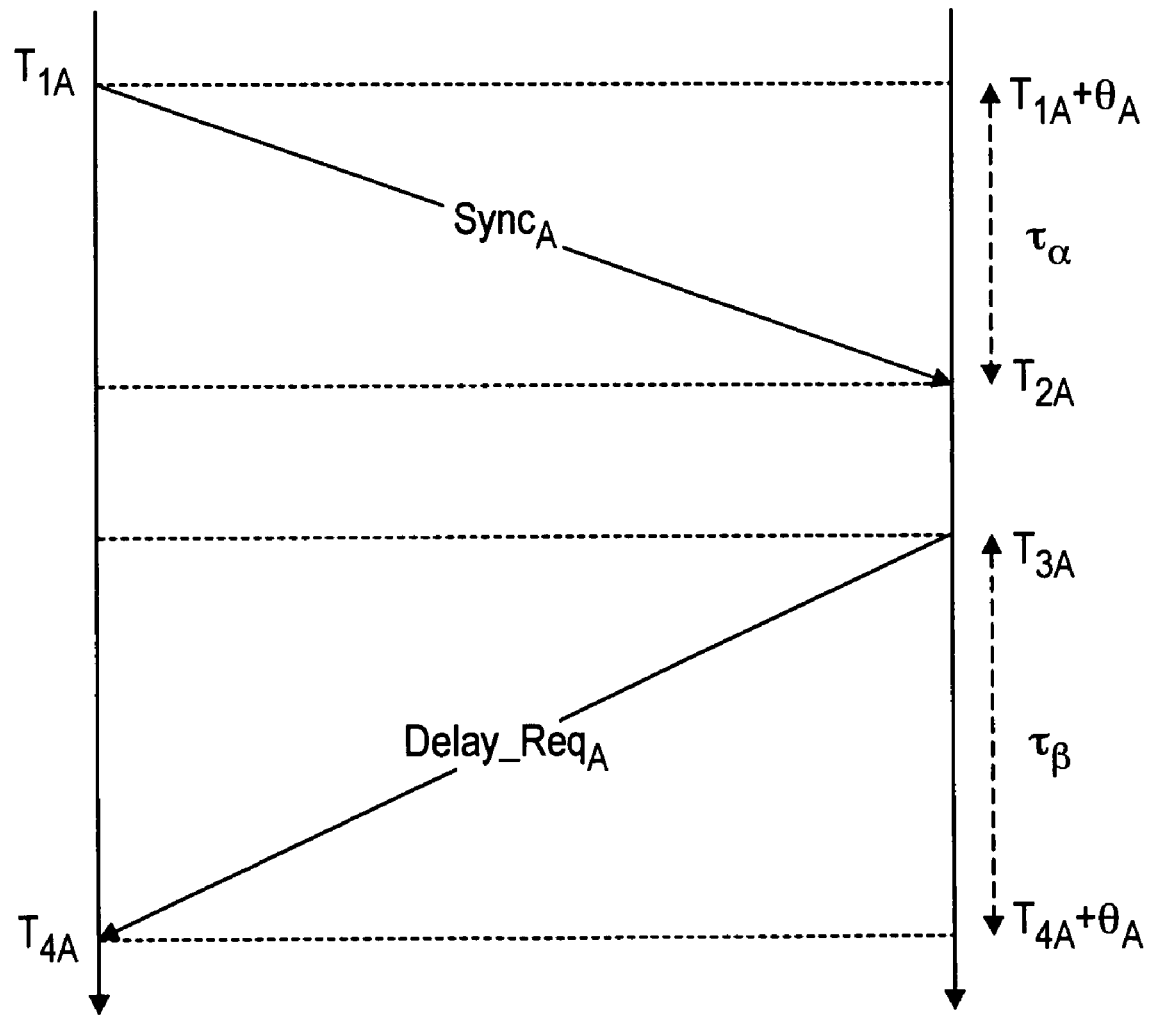
FIGS. 4a-4b illustrate a determination of an asymmetry of a communication link using IEEE 1588 time synchronization calculations.
Figure 4B:
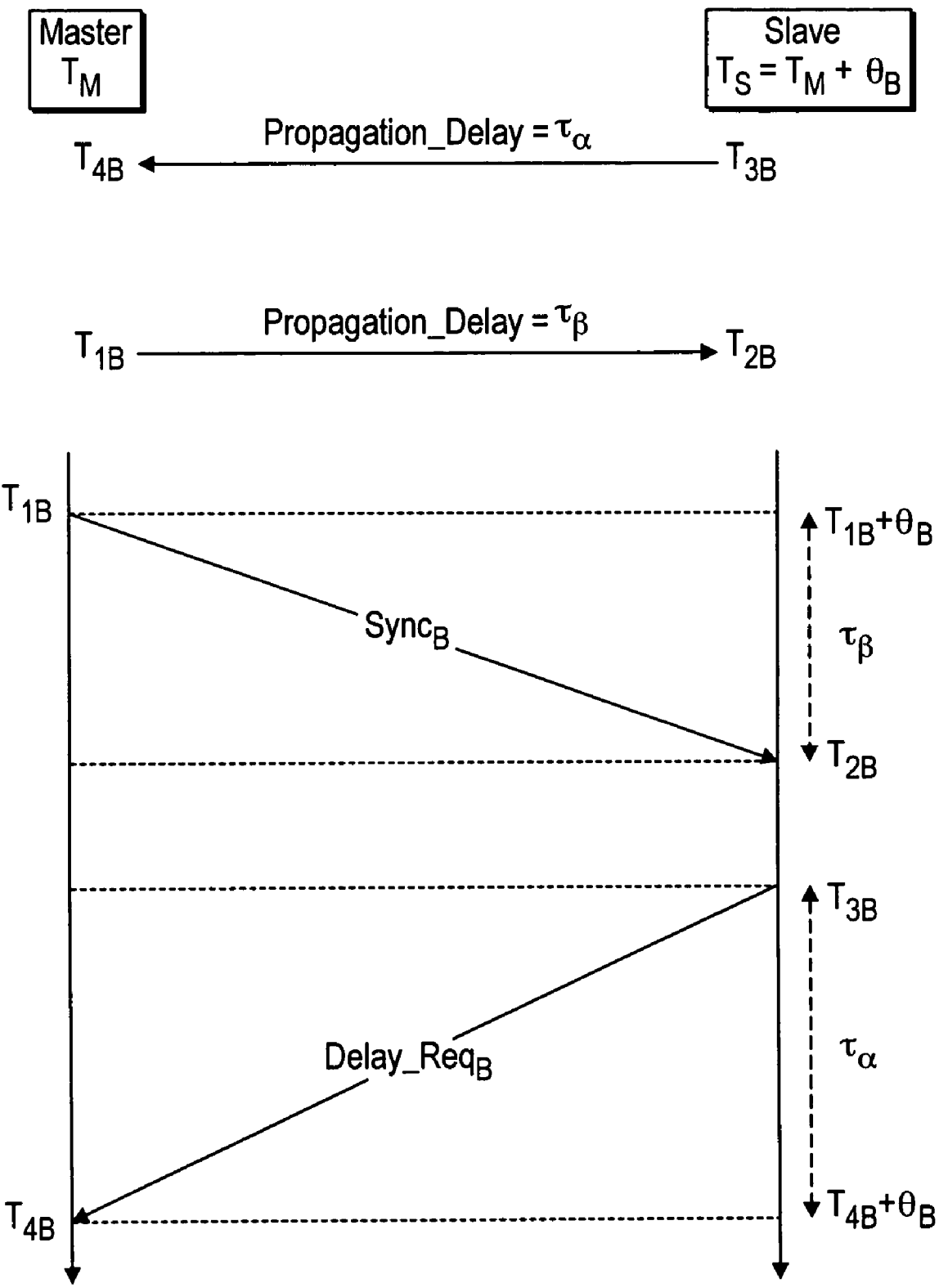

FIGS. 4a-4b illustrate a determination of the asymmetry of the communication link 110 from the experiments A and B using IEEE 1588 time synchronization calculations. In the following, the propagation delays on the communication link 110 are expressed in terms of a mean delay, the common mode part, and a differential delay as follows.

$$\tau_\alpha = \tau_m + \delta_a \text{ and}$$

$$\tau_\beta = \tau_m - \delta_a$$

These are properties of the wires in the first portion 112 and the second portion 114 of the communication link 110.

FIG. 4a represents the configuration for the experiment A in which the device 100 is the master that sends timing packets on wire alpha and the device 102 is the slave that sends the timing packets on wire beta. In the IEEE 1588 protocol, the master sends sync packets and the slave sends Delay_Req packets. From the timing diagram, the following equations can be derived by inspection.

$$T_{2A} - T_{1A} - \theta_A = \tau_{60} = \tau_m + \delta_a \text{ and}$$

$$T_{4A} - T_{3A} + \theta_A = \tau_\beta = \tau_m - \delta_a$$

From these equations the values of the mean propagation time and the offset can be determined as follows.

$$\tau_m = \frac{1}{2}\{(T_{2A} - T_{1A}) + (T_{4A} - T_{3A})\} \text{ and}$$

$$\theta_A = -\delta_a + \frac{1}{2}\{(T_{2A} - T_{1A}) - (T_{4A} - T_{3A})\}$$

FIG. 4b represents the configuration for the experiment B in which the master sends the Sync packets on wire beta and the slave sends the Delay_Req packet on wire alpha. The propagation delay values do not reverse. From the timing diagram the following equations can be derived by inspection.

$$T_{2B} - T_{1B} - \theta_B = \tau_\beta = \tau_m - \delta_a \text{ and}$$

$$T_{4B} - T_{3B} + \theta_B = \tau_\alpha = \tau_m + \delta_a$$

From these equations the values of the mean propagation time and the offset can be determined as follows.

$$\tau_m = \frac{1}{2}\{(T_{2B} - T_{1B}) + (T_{4B} - T_{3B})\} \text{ and}$$

$$\theta_B = +\delta_a + \frac{1}{2}\{(T_{2B} - T_{1B}) - (T_{4B} - T_{3B})\}$$

Comparing the equations for the experiment B with the corresponding equations for the experiment A, it is clear that the mean delay computation has the same form, i.e. the common mode. However the computation of the clock offset differs in the sign of the asymmetry term.

Thus, the difference of the clock offsets for the experiments A and B is as follows.

$$\theta_B - \theta_A = +2\delta_a + \frac{1}{2}\{(T_{2B} - T_{1B}) - (T_{2A} - T_{1A}) - (T_{4B} - T_{3B}) + (T_{4A} - T_{3A})\}$$

If the clock offsets do not change between experiments A and B then the following can be observed.

$$\theta_B = \theta_A$$

and $$\delta_a = \frac{1}{4}\{(T_{2A} - T_{1A}) - (T_{2B} - T_{1B}) - (T_{4A} - T_{3A}) + (T_{4B} - T_{3B})\}$$

The condition that the clock offsets do not change between the experiments A and B may be realized by operating the slave clock in both experiments A and B such that the only clock adjustments are those that keep the rates equal. This ensures that all measurements use the same definition of a second. A sufficient number of data points are then taken in each experiment A and B to reduce the effects of measurement noise and allowing more accurate computation of the asymmetry. Once this is done, the asymmetry is used to correct the measurements made during the normal operation of the synchronization protocol.

Figure 5:
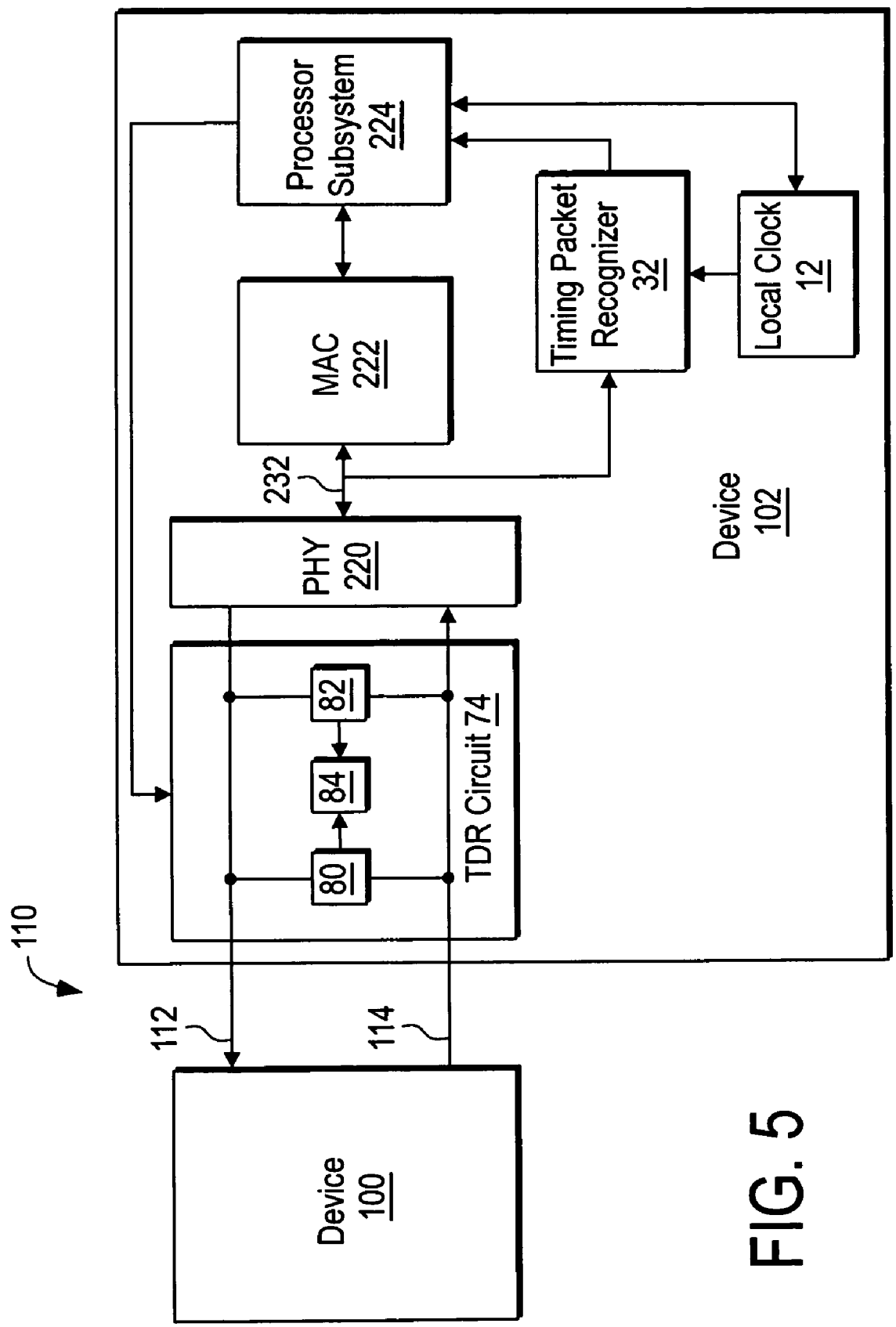
FIG. 5 shows a device that includes a time domain reflectometry (TDR) circuit for measuring an asymmetry of a communication link.

FIG. 5 shows an embodiment of the device 102 includes a time domain reflectometry (TDR) circuit 74 for measuring an asymmetry of the communication link 110. The TDR circuit 74 measures an asymmetry between a propagation delay on the first portion 112 of the communication link 110 and a propagation delay on the second portion 114 of the communication link 110.

The TDR circuit 74 includes a pulse generator circuit 80 that transmits a pulse on the first portion 112 and a pulse on the second portion 114 at substantially the same time. The pulses on the first portion 112 and second portion 114 propagate to the device 100 and are reflected back to the TDR circuit 74 via the first portion 112 and the second portion 114.

The TDR circuit 74 includes a pulse detector circuit 82 that detects the arrival of the reflected pulses on the first portion 112 and second portion 114. The TDR circuit 74 includes a timing circuit 84 that measures the times between generation of the pulses by the pulse generator 80 and the arrival of the corresponding pulse reflections via the first portion 112 and second portion 114. For example, the timing circuit 84 may include a pair of respective counters for the first portion 112 and the second portion 114 such that the respective counters are started when the corresponding pulse is generated by the pulse generator 80 and are stopped upon receipt of the corresponding reflected pulse via the first portion 112 and the second portion 114. The difference in the counts indicates an asymmetry between the propagation delays on the first and second portions 112 and 114.

The TDR circuit 74 may include switching circuitry for applying pulses to the first portion 112 and the second portion 114 and for sensing reflected pulses on the first portion 112 and the second portion 114. The switching circuitry may be used to prevent interaction with the PHY 220 in the device 102. Alternatively, the TDR circuit 74 may employ transformers for applying pulses to and sensing pulses on the first portion 112 and the second portion 114. The measurement functions of the TDR circuit 74 may be activated by a command from the processor subsystem 224 sent via a command/data path 88. The processor subsystem 224 may obtain asymmetry measurements from the TDR circuit 74 via the command/data path 88.

The energy in a pulse generated by the TDR circuit 74 may be selected to prevent damage to circuitry in the device 100, e.g. based on the physical implementations of the communication link 100 and the devices 100 and 102. The device 100 may include a protection circuit (not shown) at the connection to the communication link 110. If the TDR 74 uses pulses with low energy then no protection is needed at device 100. If the TDR 74 uses pulses with higher energy then protection might be needed. Sufficient protection may be provided for other reasons such as electrostatic effects, etc. The pulse energy may be selected to be high enough to activate protection circuitry. If the protection circuit is fast, e.g. if it activates in fractions of a nanosecond, then a large impedance mismatch occurs when the protection circuit turns on, thereby increasing the return reflection. The protection circuit may present an impedance mismatch to the communication link 110 so that more energy may be provided in reflected pulses that are returned to the TDR circuit 74.

The TDR circuit 74 may apply the pulses on the first portion 112 and the second portion 114 substantially simultaneously and at the same electrical distance from the attachment point on the first portion 112 and the second portion 114.

The TDR circuit 74 may use the local clock 12 as a time reference so that the measured asymmetry has the same time base as the time adjustment computations. The asymmetry may be measured to a resolution below that of the local clock 12 by employing delay lines and multiple time stamping, interpolating counters, or interpolating ramps.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for time synchronization of a first clock of a first device and a second clock of a second device, comprising:
   obtaining, at the first device, transmit times and receive times of timing information transmitted over a communication link between the first device and the second device, wherein each of the transmit times and receive times is based on a time of the first clock or a time of the second clock;
   using the first device to determine, from the transmit times and the receive times, i) a clock offset between the time of the first clock and the time of the second clock, and ii) an asymmetry in a propagation delay on the communication link; and
   incorporating the asymmetry into the determination of the clock offset.

2. The method of claim 1, wherein determining an asymmetry includes, using the transmit times and the receives times to determine a propagation delay on a first portion of the communication link and a propagation delay on a second portion of the communication link.

3. The method of claim 1, further comprising:
   exchanging a first set of timing packets via the communication link and determining a first clock offset in response to the first set of timing packets;
   reversing a direction of transmission on each of a first and second portion of the communication link;
   exchanging a second set of timing packets via the communication link and determining a second clock offset in response to the second set of timing packets;
   determining the asymmetry in response to the first and second clock offsets.

4. The method of claim 3, wherein reversing a direction comprises reversing a transmit line and a receive line in the second device.

5. The method of claim 4, wherein reversing a direction further comprises reversing a transmit line and a receive line in the first device.

6. The method of claim 5, wherein reversing a transmit line and a receive line in the first device comprises sensing the transmit line and the receive line in the first device.

7. The method of claim 5, wherein reversing a transmit line and a receive line in the first device comprises receiving a command sent from the second device to the first device via the communication link.

8. The method of claim 3, wherein one of the first clock and the second clock is a master clock, and the other of the first clock and the second clock is a slave clock.

9. The method of claim 8, further comprising:
   measuring a transmit time and a receive time of each a set of sync packets transferred from the first device to the second device via the communication link and each of a set of delay request packets transferred from the second device to the first device via the communication link; and
   determining the clock offset in response to the transmit and receive times and the asymmetry.

10. The method of claim 9, wherein determining the clock offset comprises determining the clock offset according to the IEEE 1588 time synchronization protocol.

11. A system, comprising:
    a first device and a second device that maintain time synchronization by exchanging timing information via a communication; and
    means for determining, from transmit times and receive times for the timing information, i) a clock offset between a time of a first clock of the first device and a time of a second clock of the second device, and ii) an asymmetry in a propagation delay on the communication link, wherein each of the transmit times and receive times is based on the time of the first clock or the time of the second clock, and wherein the asymmetry enables a correction to the clock offset.

12. The system of claim 11, wherein the means for determining an asymmetry includes a time domain reflectometry (TDR) circuit.

13. The system of claim 11, wherein the means for determining an asymmetry includes means for reversing a direction of transmission on each of a first and second portion of the communication link.

14. The system of claim 13, wherein the means for reversing a direction includes means for reversing a transmit line and a receive line in the second device.

15. The system of claim 14, wherein the means for reversing a direction further comprises means for reversing a transmit line and a receive line in the first device.

16. The system of claim 15, wherein the means for reversing a transmit line and a receive line in the first device comprises means for sensing the transmit line and the receive line in the first device.

17. The system of claim 15, wherein the means for reversing a transmit line and a receive line in the first device comprises means for sending a command to the first device via the communication link.

18. The system of claim 13, wherein one of the first clock and the second clock is a master clock, and the other of the first clock and the second clock is a slave clock.

19. The system of claim 18, wherein the clock offset is determined according to the IEEE 1588 time synchronization protocol.

20. A device, comprising:
    means for performing a time synchronization by exchanging timing information via a communication link; and
    means for determining, from transmit times and receive times for the timing information, i) a clock offset between a time of a first clock of the first device and a time of a second clock of the second device, and ii) an asymmetry in a propagation delay on the communication link, wherein each of the transmit times and receive times is based on the time of the first clock or the time of the second clock, and wherein the asymmetry enables a correction to the clock offset.

21. The device of claim 20, wherein the means for determining an asymmetry includes a time domain reflectometry (TDR) circuit.

22. The device of claim 20, wherein the device includes a master clock for the time synchronization.

23. The device of claim 20, wherein one of the first clock and the second clock is a master clock, and the other of the first clock and the second clock is a slave clock.

24. The device of claim 20, wherein the time synchronization performed according to the IEEE 1588 time synchronization protocol.

25. A device, comprising:
 means for performing a time synchronization by exchanging timing information via a communication link; and
 means for determining an asymmetry in a propagation delay on the communication link such that the asymmetry enables a correction to a clock offset between the first and second devices, wherein the means for determining an asymmetry includes means for reversing a direction of transmission on each of a first and second portion of the communication link.

26. The device of claim 25, wherein the means for reversing a direction of transmission comprises means for sending a command via the communication link.

* * * * *

UNITED STATES PATENT AND TRADEMARK OFFICE
CERTIFICATE OF CORRECTION

PATENT NO. : 7,602,873 B2  
APPLICATION NO. : 11/317294  
DATED : October 13, 2009  
INVENTOR(S) : John C. Eidson Page 1 of 1

It is certified that error appears in the above-identified patent and that said Letters Patent is hereby corrected as shown below:

On the Title page, in Item (56), under "Other Publications", in column 2, line 1, delete "Elecromagnetic" and insert -- Electromagnetic --, therefor.

In column 8, line 7, in Claim 11, delete "communication;" and insert -- communication link; --, therefor.

Signed and Sealed this

Twenty-sixth Day of January, 2010

David J. Kappos
*Director of the United States Patent and Trademark Office*